(12) United States Patent
Dumont et al.

(10) Patent No.: US 10,862,108 B2
(45) Date of Patent: Dec. 8, 2020

(54) POSITIVE ELECTRODE FOR A LITHIUM ELECTROCHEMICAL CELL

(71) Applicant: SAFT, Bagnolet (FR)

(72) Inventors: Erwan Dumont, Ambares et Lagrave (FR); Frédéric Castaing, Gradigan (FR); Cécile Tessier, Bruges (FR)

(73) Assignee: SAFT, Bagnolet (FR)

( * ) Notice: Subject to any disclaimer, the term of this patent is extended or adjusted under 35 U.S.C. 154(b) by 92 days.

(21) Appl. No.: 15/571,872

(22) PCT Filed: May 18, 2016

(86) PCT No.: PCT/EP2016/061113
§ 371 (c)(1),
(2) Date: Nov. 6, 2017

(87) PCT Pub. No.: WO2016/184896
PCT Pub. Date: Nov. 24, 2016

(65) Prior Publication Data
US 2018/0145314 A1    May 24, 2018

(30) Foreign Application Priority Data
May 19, 2015 (FR) ..................... 15 54478

(51) Int. Cl.
| | |
|---|---|
| *H01M 10/0562* | (2010.01) |
| *H01M 4/36* | (2006.01) |
| *H01M 4/505* | (2010.01) |
| *H01M 4/525* | (2010.01) |
| *H01M 4/58* | (2010.01) |
| *H01M 10/0525* | (2010.01) |
| *H01M 4/02* | (2006.01) |

(52) U.S. Cl.
CPC ........... *H01M 4/364* (2013.01); *H01M 4/505* (2013.01); *H01M 4/525* (2013.01); *H01M 4/5825* (2013.01); *H01M 10/0525* (2013.01); *H01M 2004/028* (2013.01)

(58) Field of Classification Search
CPC ...... H01M 4/364; H01M 4/505; H01M 4/525; H01M 4/5825; H01M 10/0525; H01M 10/052; H01M 2004/028
See application file for complete search history.

(56) References Cited

U.S. PATENT DOCUMENTS

| | | | |
|---|---|---|---|
| 2010/0279117 A1* | 11/2010 | Gu | ........................ C01B 25/37 428/402 |
| 2011/0223482 A1 | 9/2011 | Fujii et al. | |
| 2016/0149205 A1* | 5/2016 | Theivanayagam | ... H01M 4/661 427/58 |

FOREIGN PATENT DOCUMENTS

| | | |
|---|---|---|
| JP | 2011-113783 A | 6/2011 |
| WO | 2015/040005 A1 | 3/2015 |

OTHER PUBLICATIONS

International Search Report of PCT/EP2016/061113 dated Jun. 16, 2016 [PCT/ISA/210].

* cited by examiner

*Primary Examiner* — Raymond Alejandro
(74) *Attorney, Agent, or Firm* — Sughrue Mion, PLLC

(57) ABSTRACT

A composition of active material for a positive electrode of a lithium-ion electrochemical cell is provided comprising: (a) a lithiated oxide of formula $Li_{1+x}MO_2$ in which: $0 \leq x \leq 0.15$, M designates $Ni_aMn_bCo_cM'_d$ where $a>0$; $b>0$; $c>0$; $d \geq 0$ and $a+b+c+d=1$; M' being chosen from B, Mg, Al, Si, Ca, Ti, V, Cr, Fe, Cu, Zn, Y, Zr, Nb, Mo or a mixture of these; (b) a lithiated phosphate of formula $LiMn_{1-y}M''_yPO_4$ where M'' represents at least one element chosen from the group consisting of Fe, Ni, Co, Mg and Zn; and $0<y<0.5$; the particle size distribution of the lithiated oxide being characterized by a first volume median diameter of the particles $Dv_{50}^1 \geq 500$ nm; the particle size distribution of the lithiated phosphate being characterized by a second volume median diameter of the particles $Dv_{50}^2 \geq 500$ nm; and $Dv_{50}^2/Dv_{50}^1 \geq 1.5$.

9 Claims, 3 Drawing Sheets

POSITIVE ELECTRODE FOR A LITHIUM ELECTROCHEMICAL CELL

CROSS REFERENCE TO RELATED APPLICATIONS

This application is a National Stage of International Application No. PCT/EP2016/061113, filed May 18, 2016, claiming priority based on French Patent Application No. 15 54 478, filed May 19, 2015, the contents of all of which are incorporated herein by reference in their entirety.

FIELD OF THE INVENTION

The field of the invention is that of the active materials intended to be used in the positive electrode (or cathode) of a rechargeable lithium electrochemical cell (or secondary cell).

BACKGROUND OF THE INVENTION

In a secondary cell, an active material is a material which participates in the electrochemical reactions to produce electrical energy when the secondary cell is discharging. Transition metal lithiated oxides are known as cathodic active material able to be used in lithium secondary cells. In the positive electrode, lithiated oxides of transition metals of general formula $LiMO_2$, in which M represents at least one transition metal such as Mn, Ni, Co or a mixture thereof, are most frequently used as the active material. These active materials allow high performance to be achieved, in particular in terms of cyclic reversible capacity and lifetime. For example, $LiCoO_2$ and $LiNiO_2$ have respectively a capacity of about 180 and 220 mAh/g. $LiCoO_2$, however, has two major disadvantages, which are its toxicity and high cost.

It is also known to use a lithiated oxide of manganese belonging to the family of spinels and having the formula $LiMn_2O_4$. This compound has a low cost and an absence of toxicity but has a reduced capacity (110 mAh/g) and a reduced lifetime resulting from the significant dissolution of the oxide in the electrolyte of the secondary cell.

Other active materials with a lower cost than $LiCoO_2$ and exhibiting good thermal stability and an absence of toxicity have been studied, among which there are the lithiated phosphates of at least one transition metal, such as $LiFePO_4$ and $LiMnPO_4$. However, the use of $LiFePO_4$ and $LiMnPO_4$ is hampered by their low electron conductivity. It is generally necessary to add to the electrode a high proportion of an electron-conducting material in order to obtain a secondary cell having good discharge performance at a high current. In addition, $LiFePO_4$ has a low specific energy, due to its low electrochemical operating potential. $LiMnPO_4$ has a higher operating potential, but on the other hand exhibits poor life when it is used as a positive electrode material in conjunction with a negative electrode of graphite in a secondary cell operating under cycling conditions. Moreover, it is difficult to reduce the porosity of an electrode produced with either of these materials, which leads to a low capacity per unit mass of the cell containing these materials.

There is a need for a secondary cell having a high capacity per unit mass and a high cycling life.

US 2013/0280610 discloses an active material composition for a positive electrode of a lithium electrochemical cell, said composition comprising:
 a lithiated oxide of nickel, cobalt and manganese,
 a lithiated phosphate of iron and manganese.

This document teaches that using lithiated oxide powder of nickel, cobalt and manganese, the particle size of which is different from that of lithiated phosphate powder of iron and manganese, results in a decrease in the electrical conductivity of the electrode. To overcome this problem, the use as starting material of a lithiated phosphate powder of iron and manganese the size of the so-called "primary" particles of which is from 5 to 200 nm is described. These particles are agglomerated into so-called "secondary" particles. To do this, a centrifugal vaporization drying technique is employed. The primary particles are mixed with water and the mixture is subjected to stirring. The primary particles agglomerate into secondary particles under the effect of drying by centrifugal vaporization. The size of the secondary particles obtained can then be in the range from 5 to 20 µm. This document teaches that by forming secondary particles of iron and manganese lithiated phosphate whose size is close to that of lithiated oxide particles of nickel, cobalt and manganese, the electron conductivity of the active material and the capacity of the electrode are increased. The manufacturing process described in this document is complex because it requires the use of the centrifugal vaporization drying technique to create agglomerates.

WO 2006/071972 discloses an active material composition for a positive electrode of a lithium electrochemical cell, said composition comprising:
 a lithiated oxide of cobalt or a lithiated oxide of nickel,
 a lithiated oxide of manganese of the type $LiMn_2O_4$ or a lithiated phosphate which is either $LiFePO_4$ or $LiMnPO_4$.

This document gives no information on the size of the lithiated phosphate and lithiated oxide particles used.

US 2014/0138591 discloses an active material composition for a positive electrode of a lithium electrochemical cell, said composition comprising:
 a lithiated phosphate of iron and manganese,
 a lithiated oxide of nickel, manganese and cobalt.

It is said that the use of this composition makes it possible to manufacture a cell having a high capacity per unit mass, as well as increased safety of use in the event of an increase in temperature. The lithiated phosphate of iron and manganese is preferably in the form of a powder whose particle size is less than 100 nm. According to this document, using this range of particle sizes would favor the transport of lithium and increase the electron conductivity of lithiated phosphate of iron and manganese. Nevertheless, the Applicant has found that the use of such a range of particle sizes makes it difficult to produce an electrode. This difficulty results in:
 either a porosity that is too high,
 or poor adhesion of the active material to the current collector supporting the electrode during the calendering step of the electrode.

Calendering is one of the manufacturing steps of the electrode during which the current collector of the electrode, coated on at least one of its faces with active material, passes between two rotating cylinders. The two cylinders exert pressure on the electrode. By adjusting the spacing between the two cylinders, the thickness of the electrode and its porosity can be adjusted to the desired values.

US 2014/0045069 discloses an active material composition for a positive electrode of a lithium secondary cell, said composition comprising:
 a compound of the $LiNi_{1-b}Z_bO_2$ type, in which Z represents one or more elements chosen from Co, Mn, Al, Mg and V; and b ranges from 0 to 0.4.
 a compound of the $LiMn_{1-a}X_aPO_4$ type in which X represents Mg and/or Fe and a ranges from 0 to 0.3.

It is said that this composition should make it possible to reduce elution of the manganese in the electrolyte and to increase the lifetime of the cell when subject to cycling. In order to produce this active material composition, the starting materials for each of these two compounds are powders whose particle size is preferably between 1 and 40 nm. According to this document, the use of such a size range would make it possible to reduce the dissolution of the active material in the electrolyte, to facilitate the insertion of the lithium ions into the active material and to reduce the electrical resistance of the electrode. Nevertheless, the Applicant has found that, like with US 2014/0138591, discussed above, the use of such a range of particle sizes made it difficult to produce an electrode.

WO 2014/102071 discloses a positive electrode of a lithium secondary cell comprising a current collector on which at least two layers of electrochemically active material are deposited. The first layer in contact with the current collector may be a mixture of a lithiated phosphate of iron and manganese with a lithiated oxide of a transition metal. The second layer contains a lithiated phosphate of iron. This document gives no information on the size of the lithiated phosphate and lithiated oxide particles used.

JP 2011-113783 discloses an active material composition for a positive electrode of a lithium secondary cell, said composition comprising, for example:
a first compound which is a lithiated phosphate of iron and manganese, in the form of particles;
a second compound which is a lithiated oxide of nickel, cobalt and manganese, in the form of particles;
in which the ratio of the diameter of the lithiated oxide particles of nickel, cobalt and manganese to the diameter of the lithiated phosphate particles of iron and manganese is 1.5 or greater. Accordingly, in this document, the ratio of the lithiated iron and manganese phosphate particle diameter to the diameter of the nickel, cobalt and manganese lithiated oxide particles is less than or equal to 0.67.

There is a need for a positive electrode for a lithium ion secondary cell which exhibits both a low porosity, i.e. a porosity of less than about 50%, preferably between 30 and 40%, and of which the active material composition has good adhesion to the current collector. Preferably, it is desirable that this electrode has a high capacity per unit mass. Additionally, preferably, it is desirable for it to have a high lifetime when it is used under cycling conditions.

SUMMARY OF THE INVENTION

The invention provides a positive electrode active material composition for an electrochemical lithium-ion cell comprising:
a lithiated oxide of transition metals of formula $Li_{1+x}MO_2$ in which:
$0 \leq x \leq 0.15$, M denotes $Ni_aMn_bCo_cM'_d$ where $a>0$; $b>0$; $c>0$; $d\geq 0$ and $a+b+c+d=1$; M' being selected from the group consisting of B, Mg, Al, Si, Ca, Ti, V, Cr, Fe, Cu, Zn, Y, Zr, Nb, Mo or a mixture thereof;
a lithiated phosphate of transition metals of the formula $LiMn_{1-y}M''_yPO_4$ where M'' represents at least one element selected from the group consisting of Fe, Ni, Co, Mg and Zn; and $0<y<0.5$;
the lithiated oxide and the lithiated phosphate being in the form of particles;
the particle size distribution of the lithiated oxide being characterized by a first median volume diameter of the particles $Dv_{50}^1 \geq 500$ nm;
the particle size distribution of the lithiated phosphate being characterized by a second median volume diameter of the particles $Dv_{50}^2 \geq 500$ nm;
and $Dv_{50}^2/Dv_{50}^1 \geq 1.5$.

According to one embodiment, the lithiated phosphate of transition metals is coated with a carbon layer.

According to one embodiment, the composition comprises from 30 to 80% by weight of lithiated oxide, and from 70 to 20% by weight of lithiated phosphate.

According to one embodiment, the composition comprises from 20 to 50% by weight of lithiated oxide, and from 80 to 50% by weight of lithiated phosphate.

According to one embodiment, $0.60 \geq a \geq 0.45$; $0.35 \geq b \geq 0.25$; $0.25 \geq c \geq 0.14$.

According to one embodiment, $Dv_{50}^2 \geq 1$ μm and $Dv_{50}^1 \geq 1$ μm.

According to one embodiment, $Dv_{50}^2 \geq 15$ μm and $Dv_{50}^1 \geq 5$ μm.

According to one embodiment, $Dv_{50}^2/Dv_{50}^1 \geq 2$, preferably $Dv_{50}^2/Dv_{50}^1 \geq 3$.

According to one embodiment, M'' is Fe.

According to one embodiment, $a \leq 0.50$.

The invention also provides an electrode comprising the above active material composition.

According to one embodiment, the electrode comprises only the lithiated oxide of transition metals and the lithiated phosphate of transition metals as electrochemically active materials.

Finally, the invention also provides an electrode lithium secondary cell comprising:
at least one positive electrode which is an electrode as described above;
at least one negative electrode comprising a material capable of inserting and de-inserting lithium in its structure.

Figure 1:
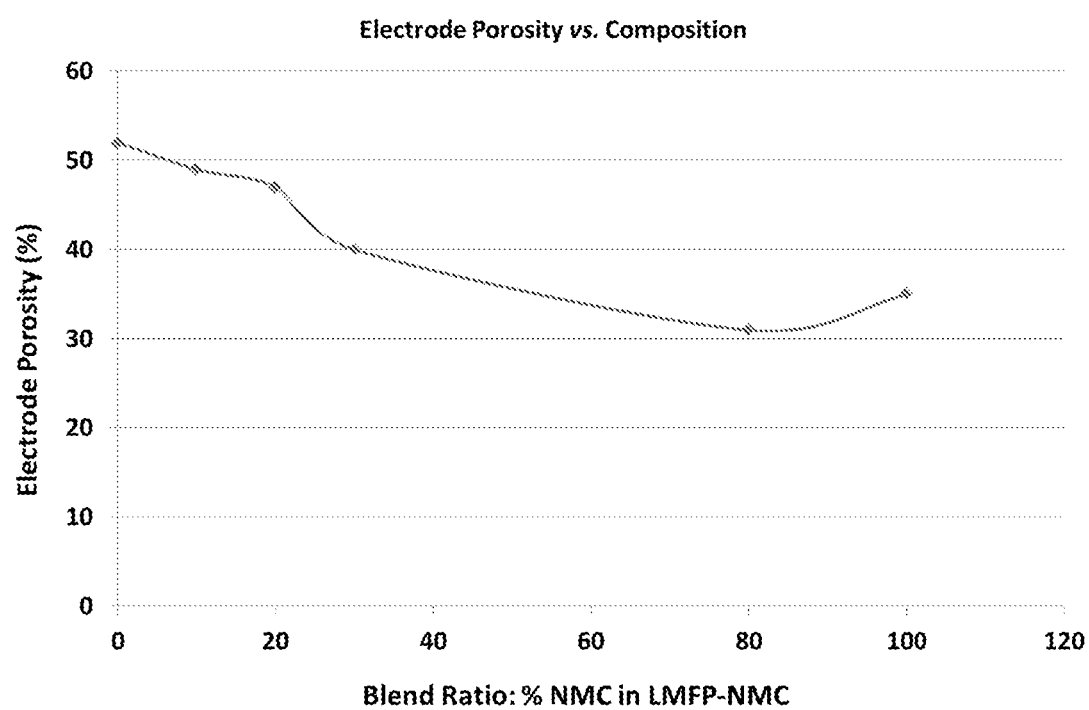
FIG. 1 shows variation in the porosity of an active material composition comprising lithiated oxide in increasing proportions.

The present invention is obviously not limited to the examples and embodiments described and illustrated, but may be the subject of numerous variants accessible to those skilled in the art.

DETAILED DESCRIPTION OF PREFERRED EMBODIMENTS

The lithiated oxide of transition metals used in the invention has the formula $L_{1+x}MO_2$ in which:

$$0 \leq x \leq 0.15,$$

M denotes $Ni_aMn_bCo_cM'_d$ where $a>0$; $b>0$; $c>0$; $d\geq 0$ and $a+b+c+d=1$; and M' is selected from the group consisting of B, Mg, Al, Si, Ca, Ti, V, Cr, Fe, Cu, Zn, Y, Zr, Nb, Mo or a mixture thereof.

According to one embodiment, $a \leq 0.60$.
According to one embodiment, $a < 0.60$.
According to one embodiment, $a \leq 0.50$.
According to one embodiment, $0.55 \geq a \geq 0.45$.

According to one embodiment, 0.40≥b≥0.15; preferably 0.35≥b≥0.20.

According to one embodiment, 0.30≥c≥0.10; preferably 0.25≥c≥0.15.

According to one embodiment, x≤0.10; preferably 0.01≤x≤0.06.

Examples of lithiated oxide are:

$LiNi_{1/3}Mn_{1/3}Co_{1/3}O_2$;

$Li_{1+x}N_{0.5}Mn_{0.3}Co_{0.2}O_2$ with 0.01≤x≤0.10, preferably 0.01≤x≤0.06;

$Li_{1+x}Ni_{0.6}Mn_{0.2}Co_{0.2}O_2$ with 0.01≤x≤0.10, preferably 0.01≤x≤0.06.

In one embodiment, Ni, Mn and Co are partially substituted with aluminum, such as the compound of formula $LiNi_{0.3}Mn_{0.5}Co_{0.15}Al_{0.05}O_2$.

The lithiated transition metal phosphate used in the invention has the formula $LiMn_{1-y}M''_yPO_4$ where M'' represents at least one element selected from the group consisting of Fe, Ni, Co, Mg and Zn; and 0<y<0.5. Preferably M'' is Fe.

In one embodiment y≥0.10. Preferably, y≥0.20. More preferably, y≥0.30.

Examples of lithiated phosphate are $LiFe_{0.2}Mn_{0.8}PO_4$; $LiFe_{0.33}Mn_{0.67}PO_4$.

According to the invention, the lithiated oxide and the lithiated phosphate used are each in the form of a powder. The size distribution of lithiated oxide particles is characterized by a first median volume diameter $Dv_{50}^1$ of 500 nm or more. The size distribution of the lithiated phosphate particles is characterized by a second median volume diameter $Dv_{50}^2$ of 500 nm or more. The term "equivalent diameter" of a particle designates the diameter of a sphere having the same volume as this particle. The term median means that 50% of the volume of the lithiated oxide (or lithiated phosphate) particles consists of particles having an equivalent diameter of less than 500 nm and 50% of the particle volume of the lithiated oxide (or lithiated phosphate) particles is composed of particles having an equivalent diameter greater than 500 nm.

In a preferred embodiment, $Dv_{50}^1$ and $Dv_{50}^2$ are greater than or equal to 1 µm. In a preferred embodiment, $Dv_{50}^1$ is greater than or equal to 5 µm and/or $Dv_{50}^2$ is greater than or equal to 15 µm.

In a preferred embodiment, 90% of the volume of the lithiated oxide (or lithiated phosphate) particles consists of particles having an equivalent diameter of greater than 500 nm and 10% of the volume of the lithiated oxide (or lithiated phosphate) is composed of particles having an equivalent diameter of less than 500 nm.

The invention therefore excludes the use of nanoscale lithiated oxide or lithiated phosphate powder, that is to say the equivalent diameter of which is less than about 100 nm.

The particle size measurement can be carried out using a laser particle size measuring technique.

According to the invention, the ratio $Dv_{50}^2/Dv_{50}^1$ is greater than or equal to 1.5. In a preferred embodiment, $Dv_{50}^2/Dv_{50}^1$ is greater than or equal to 2, or even greater than or equal to 3. This has the effect of reducing the porosity of the active material, and therefore of increasing its compactness. The increase in compactness allows an increase in the energy density of the electrode.

As explained above, it is known that a lithiated phosphate is a poor electron conductor whereas a lithiated oxide is a good electron conductor and therefore it is preferable to use lithiated oxide particles with a median diameter in volume higher than that of the lithiated phosphate particles. However, it has been found that it is possible to manufacture an electrode having a satisfactory capacity per unit mass even using lithiated phosphate particles having a larger median volume diameter than the lithiated oxide particles.

The lithiated oxide and lithiated phosphate powders can be obtained by grinding particles larger than the desired size followed by sieving to retain only the particles of desired size. The lithiated oxide and lithiated phosphate powders can also be obtained from particles of smaller size than desired. The particles are agglomerated to form a cluster, referred to as "secondary" particles as opposed to the non-agglomerated particles referred to as "primary" particles. The secondary particles can be obtained, for example, using the centrifugal spray drying technique. This technique is further described in US 2013/0280610, discussed above. The person skilled in the art has the necessary knowledge to determine the operating conditions for crushing and sieving the particles or agglomerating them to obtain secondary particles.

According to one embodiment, a lithiated phosphate powder consists essentially of primary particles whose median volume diameter $Dv_{50}^2$ is greater than or equal to 500 nm, and not of secondary particles.

The lithiated oxide of transition metals and the lithiated phosphate are mixed to form an active material composition. The lithiated oxide and the lithiated phosphate can be mixed using conventional mixing techniques, for example a planetary mixer, to obtain the active ingredient composition according to the invention. According to one embodiment, the active material composition does not comprise any active material other than lithiated oxide and lithiated phosphate. In one embodiment, the lithiated phosphate is coated with a carbon layer before it is mixed with the lithiated oxide.

In the mixture obtained, the lithiated oxide may represent from 20 to 80% by weight of the composition and the lithiated phosphate may represent from 80 to 20% by weight of the composition.

In a preferred embodiment, the lithiated oxide represents from 30 to 80% by weight of the composition and the lithiated phosphate represents from 70 to 20% by weight of the composition. It has indeed been found that the porosity of the electrode is optimal in the range of 30 to 80% of lithiated oxide. FIG. 1 shows variation in the porosity of an active material composition comprising lithiated oxide in increasing proportions. It shows different portions:

when the active material composition consists practically solely of lithiated phosphate, i.e. it contains less than 5% by weight of lithiated oxide, its porosity is high. It is greater than 50%. An electrode whose electrochemically active material consists essentially of lithiated phosphate can hardly be compacted. This difficulty in reducing the porosity of the electrode leads to problems of electron conductivity of the electrode and therefore problems of chargeability and dischargeability.

when the active material composition comprises 30 to 80% of lithiated oxide, the porosity is between 30 and 40%, which is what is desired. The choice of the 30 to 80% percentage range thus makes it possible to reduce the porosity of the electrode and to solve the problems of poor electron conductivity of the electrode.

when the active material composition comprises more than 80% of lithiated oxide, the porosity of the mixture increases, which is not desirable.

Figure 2:
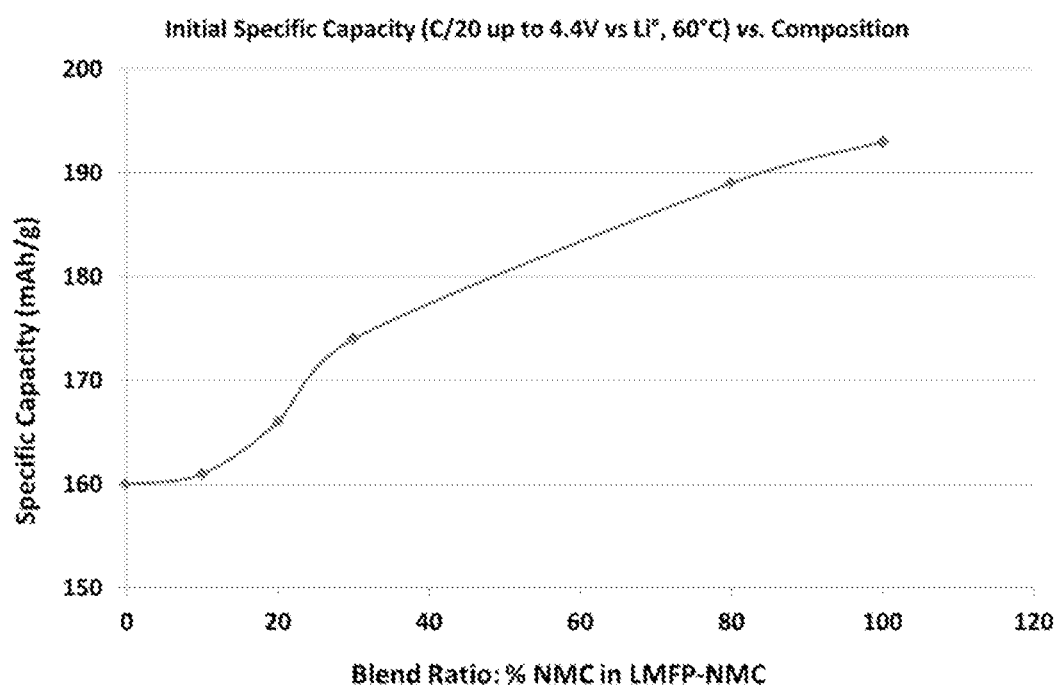
FIG. 2 shows variation in the capacity per unit mass of an active material composition comprising lithiated oxide in increasing proportions.

It has also been found that the capacity per unit mass of the active material composition reaches its maximum value when the lithiated oxide represents 20 to 30% by weight of the composition. FIG. 2 shows variation in the capacity per unit mass of an active material composition comprising lithiated oxide in increasing proportions. Surprisingly, it shows that the capacity per unit mass of the electrode does not follow a linear law, and finds an optimum for a mixture comprising from 20 to 30% by weight of lithiated oxide.

Figure 3:
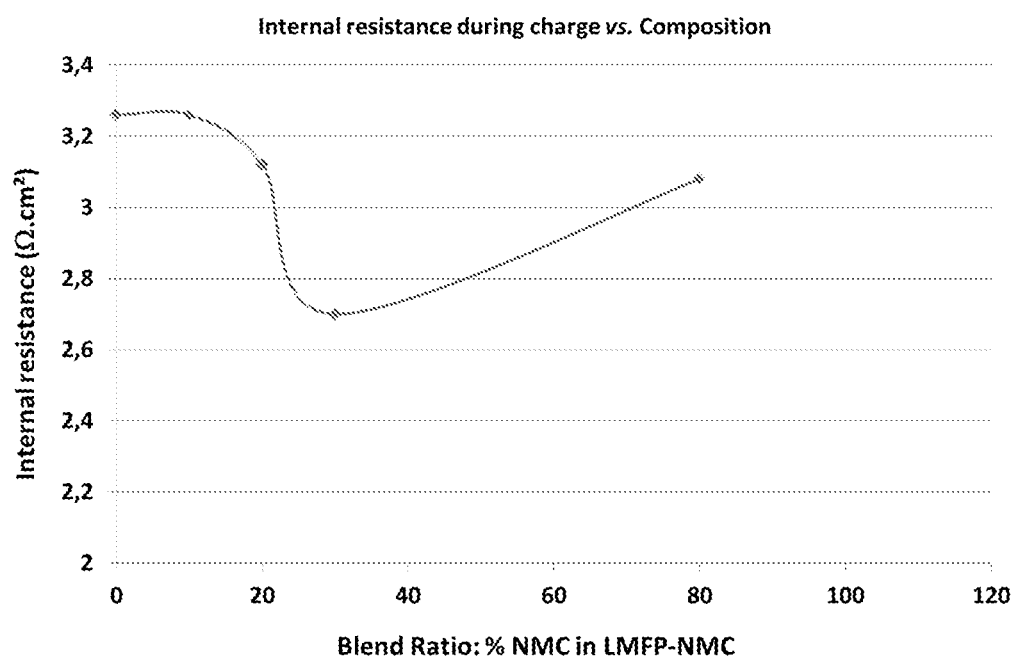
FIG. 3 shows variation of the internal resistance of an active material composition comprising lithiated oxide in increasing proportions.

It has also been found, surprisingly, that the internal resistance of the bulk composition of the active material of the composition does not vary linearly with the amount of lithiated oxide. FIG. 3 shows variation of the internal resistance of an active material composition comprising increasing proportions of lithiated oxide. It shows that the internal resistance passes through a minimum when the composition comprises from 20 to 70%, preferably from 25 to 50% by weight, of lithiated oxide. Preferably, the lithiated oxide represents from 30 to 45% by weight of the composition. More preferably, the lithiated oxide represents from 35 to 40% by weight of the composition.

The method of depositing the active material composition on a current collector will now be described. The deposition can be carried out by a coating process. In this process, a paste is prepared by mixing the active material composition with, generally, a binder, an electron conductive compound and a solvent which may be organic or aqueous. In the case of an organic solvent, this may be N-methyl-2-pyrrolidone (NMP). The paste is deposited on a metal foil serving as a current collector. The paste may be deposited either on one side of the current collector only or simultaneously on both sides of the current collector. An electrode is then obtained, which is dried to evaporate the solvent. The electrode can then be compressed during a calendering step. The calendering step makes it possible to adjust the thickness of the deposited layer. The deposited layer has a thickness after calendering generally between 25 μm and 300 μm. The amount of paste deposited on the current collector generally ranges from 15 mg/cm$^2$ to 50 mg/cm$^2$, which makes it possible to produce a cell suitable for applications requiring high energy or applications requiring high power. Since lithiated oxide and lithiated phosphate are mixed prior to deposition on the current collector, the invention excludes the situation in which the lithiated oxide and the lithiated phosphate are in the form of two distinct superimposed layers.

The active ingredient composition generally represents from 80 to 98% by weight of the weight of the paste.

The binder and the electron conductive compound each generally represent from 1 to 10% by weight of the weight of the paste.

The current collector is preferably a two-dimensional conductive support, such as a solid or perforated foil, based on carbon, or metal for example of nickel, steel, stainless steel or aluminum. Generally, the current collector of the positive electrode is made of aluminum and its thickness is between 6 μm and 35 μm.

The function of the binder is to reinforce cohesion between the particles of active material and to improve the adhesion of the paste to the current collector. The binder may contain one or more of the following components: polyvinylidene fluoride (PVdF) and copolymers thereof, polytetrafluoroethylene (PTFE), polyacrylonitrile (PAN), methyl or butyl polymethacrylate, polyvinyl chloride (PVC), polyvinylformal, polyesters and polyether block amides, polymers of acrylic acid, methacrylic acid, acrylamide, itaconic acid, sulfonic acid, elastomers and cellulose compounds.

Among the elastomers that may be used are ethylene/propylene/diene terpolymers (EPDM), styrene/butadiene copolymers (SBR), acrylonitrile/butadiene (NBR) copolymers, styrene/butadiene/styrene (SBS) block copolymers or styrene/acrylonitrile/styrene block copolymers (SIS), styrene/ethylene/butylene/styrene copolymers (SEBS), styrene/butadiene/vinylpyridine terpolymers (SBVR), polyurethanes (PU), neoprene, polyisobutylenes (PIB), butyl rubbers, and mixtures thereof.

The cellulosic compound may be carboxymethylcellulose (CMC), hydroxypropylmethylcellulose (HPMC), hydroxypropylcellulose (HPC) or hydroxyethylcellulose (HEC).

The electron conductive additive is generally selected from graphite, carbon black, acetylene black, soot or a mixture thereof.

The present invention also provides a lithium secondary cell comprising a positive electrode as described above. The secondary cell according to the invention further comprises at least one negative electrode, at least one electrolyte and at least one separator and which will now be described.

The negative electrode is prepared in a conventional manner. The active material may be lithium metal or a lithium metal alloy. It may also be constituted by a conductive support serving as a current collector which is coated with a layer containing the active material and further comprising a binder and a conductive material. The active material is capable of inserting lithium into its structure. It may be chosen from lithium compounds, a carbonaceous material capable of inserting lithium into its structure such as graphite, coke, carbon black and vitreous carbon. It may also contain tin, silicon, carbon and silicon compounds, carbon and tin-based compounds and carbon, tin and silicon compounds and an oxide of titanium such as $Li_4Ti_5O_{12}$. It may include silicon, the surface of which is grafted by an organic group as described in document EP-A-2,242,129. It may comprise a SiC nanocomposite material as described in document FR-A-2,885,734. The anodes used may also consist of oxides, nitrides or phosphides of transition metals.

The current collector of the negative electrode may be of copper.

The electrolyte is chosen from a non-aqueous liquid electrolyte comprising a lithium salt dissolved in a solvent and a solid ion-conductive polymer electrolyte of lithium ions, such as, for example, polyethylene oxide (PEO).

The lithium salt is chosen from lithium perchlorate $LiClO_4$, lithium hexafluorophosphate $LiPF_6$, lithium tetrafluoroborate $LiBF_4$, lithium trifluoromethanesulfonate $LiCF_3SO_3$, lithium bis(fluorosulfonyl) imide $Li(FSO_2)_2N$ (LiFSI), lithium trifluoromethanesulfonimide $LiN(CF_3SO_2)_2$ (LiTFSI), lithium trifluoromethanesulfonemethide $LiC(CF_3SO_2)_3$ (LiTFSM), lithium bisperfluoroethanesulfonimide $LiN(C_2F_5SO_2)_2$ (LiBETI), lithium 4,5-dicyano-2-(trifluoromethyl) imidazolide (LiTDI), lithium bis (oxalatoborate) (LiBOB), lithium tris(pentafluoroethyl) trifluorophosphate $LiPF_3(CF_2CF_3)_3$ (LiFAP) and mixtures of the foregoing.

Preferably, the solvent is a solvent or a mixture of solvents chosen from the usual organic solvents, in particular saturated cyclic carbonates, unsaturated cyclic carbonates, non-cyclic carbonates, alkyl esters, such as formates, acetates, propionates or butyrates, ethers, lactones such as gamma-butyrolactone, tetrahydrothiofene dioxide, nitrous solvents, and mixtures thereof. Among the saturated cyclic carbonates, there may be mentioned, for example, ethylene carbonate (EC), fluoroethylene carbonate (FEC), propylene carbonate (PC), butylene carbonate (BC), and mixtures thereof. Among the unsaturated cyclic carbonates, mention may be made, for example, of vinylene carbonate (VC), its derivatives and mixtures thereof. Among the non-cyclic carbonates, there may be mentioned, for example, dimethyl carbonate (DMC), diethyl carbonate (DEC), methyl ethyl carbonate (EMC), dipropyl carbonate (DPC) and mixtures thereof. Examples of alkyl esters which may be mentioned are methyl acetate, ethyl acetate, methyl propionate, ethyl propionate, butyl propionate, methyl butyrate, ethyl butyrate, propyl butyrate, and mixtures thereof. Among the ethers, there may be mentioned, for example, dimethyl ether (DME) or diethyl ether (DEE), and mixtures thereof.

The separator may be made of a layer of polypropylene (PP), polyethylene (PE), polytetrafluoroethylene (PTFE), polyacrylonitrile (PAN), polyethylene terephthalate (PET) or a mixture of layers of different natures. The polymers mentioned may be coated with a ceramic layer.

EXAMPLES

In the examples below, the positive electrode comprises a current collecting support which is an aluminum foil. A layer consisting of a paste comprising, after evaporation of the solvent, is deposited on it by coating:
- 89% by weight of a active material composition according to the invention. The chemical formula of lithiated oxide and lithiated phosphate entering the active ingredient composition and their respective proportions are shown in Table 1 below;
- 6% by weight of a mixture of carbon black and graphite as an electron conductive agent;
- 5% by weight of polyvinylidene fluoride (PVDF) as binder.

The electrode thus produced is then calendered.

The negative electrode comprises metallic lithium as the active material.

The separator used comprises polypropylene and polyethylene.

The electrolyte is a lithium salt dissolved in a solvent based on alkyl carbonates.

Secondary cells were manufactured. They differ in the composition of the active material used in the positive electrode. These different electrodes are nevertheless calendered in identical manner. The negative electrodes, the separators and the electrolyte are identical. These electrochemical cells underwent a life cycle test at 60° C. The discharge current is C/5, where C is the nominal capacity of the cell. Charging takes place at a current of C/5 up to a voltage of 4.4 V without maintenance charging (without floating). For each secondary cell manufactured, the following parameters were evaluated qualitatively.
- Feasibility of the electrode, i.e. measurement of the adhesion of the active material composition to the current collector and measurement of the porosity of the electrode
- Initial capacity of the secondary cell
- Capacity retention after 50 cycles at 60° C.

The porosity of the electrode is calculated after the calendering step by the difference between the geometric volume calculated from the dimensions of the electrode and the theoretical volume calculated from the densities of the various components of the electrode divided by the theoretical volume.

The results are summarized in Table 1 below:

TABLE 1

| Ex. | ratio LFMP*/NMC** (%/%) | $Dv_{50}^{2(LFMP)}$ (μm) | $Dv_{50}^{1(NMC)}$ (μm) | Composition of the NMC | Composition of the LFMP | Feasability of the electrode | Initial Capacity | Retention of capacity after 50 cycles at 60° C. |
|---|---|---|---|---|---|---|---|---|
| 1 | 100/0 | 18 | | | $LiFe_{0.33}Mn_{0.67}PO_4$ | − | + | ++ |
| 2 | 90/10 | 18 | 6 | $Li_{1.06}Ni_{0.5}Mn_{0.3}Co_{0.2}O_2$ | $LiFe_{0.33}Mn_{0.67}PO_4$ | + | + | ++ |
| 3 | 80/20 | 18 | 6 | $Li_{1.06}Ni_{0.5}Mn_{0.3}Co_{0.2}O_2$ | $LiFe_{0.33}Mn_{0.67}PO_4$ | + | + | ++ |
| 4 | 70/30 | 18 | 6 | $Li_{1.06}Ni_{0.5}Mn_{0.3}Co_{0.2}O_2$ | $LiFe_{0.33}Mn_{0.67}PO_4$ | ++ | ++ | ++ |
| 5 | 20/80 | 18 | 6 | $Li_{1.06}Ni_{0.5}Mn_{0.3}Co_{0.2}O_2$ | $LiFe_{0.33}Mn_{0.67}PO_4$ | ++ | ++ | + |
| 6 | 0/100 | | 6 | $Li_{1.06}Ni_{0.5}Mn_{0.3}Co_{0.2}O_2$ | | ++ | ++ | − |
| 7 | 70/30 | 0.2 | 6 | $Li_{1.06}Ni_{0.5}Mn_{0.3}Co_{0.2}O_2$ | $LiFe_{0.33}Mn_{0.67}PO_4$ | −− | | |
| 8 | 70/30 | 0.2 | 6 | $Li_{1.06}Ni_{0.5}Mn_{0.3}Co_{0.2}O_2$ | $LiFe_{0.2}Mn_{0.8}PO_4$ | −− | | |
| 9 | 70/30 | 18 | 6 | $Li_{1.01}Ni_{0.6}Mn_{0.2}Co_{0.2}O_2$ | $LiFe_{0.33}Mn_{0.67}PO_4$ | ++ | ++ | ++ |

*The abbreviation NMC denotes lithiated oxide of transition metals.
**The abbreviation LFMP denotes lithiated phosphate of transition metals.
−−: very insufficient
−: insufficient
+: satisfactory
++: very satisfactory Examples 7 and 8 show that the use of a lithiated phosphate powder whose median volume diameter $Dv_{50}^2$ of the particles is 0.2 μm does not make it possible to obtain satisfactory feasibility: either the active material does not adhere to the current collector after the calendering step, or its porosity is too high.

Examples 2-6 and 9 show that when the lithiated phosphate particles are characterized by a $Dv_{50}^2$ value of 18 μm, a satisfactory feasibility of the electrode (indicated by the symbols "+" and "++") is obtained.

The electrode of Example 6 exhibits poor capacity retention due to the absence of lithiated phosphate.

Among the compositions in which the lithiated phosphate particles have a $Dv_{50}^2$ of 18 μm, the following results are observed:

The composition of Example 1 has a too high porosity (about 52%), due to the absence of lithiated oxide.

The feasibility of the electrodes of Examples 4, 5 and 9 is very satisfactory (indicated by the symbol "++"). The active material composition of these electrodes contains between 30% and 80% of lithiated oxide. In these examples, the porosity is less than or equal to about 40%, which is very satisfactory. The compositions of Examples 4 and 9 which contain 30% NMC provide both satisfactory feasibility, initial capacity and capacity retention.

The electrodes of Examples 2 and 3 have a porosity which is higher than that of Examples 4 and 5, and is therefore less satisfactory, due to a lower percentage of lithiated oxide (10%, 20% for Examples 2 and 3 instead of 30% and 80% for Examples 4 and 5).

The invention claimed is:

1. A positive electrode active material composition, for an electrochemical lithium-ion cell, comprising
from 10 to 80% of a lithiated oxide of transition metals of formula $Li_{1+x}MO_2$ in which:
$0 \leq x \leq 0.10$, M denotes $Ni_aMn_bCo_cM'_d$ where $a \geq 0.5$; $0.4 \geq b \geq 0.1$; $0.3 \geq c \geq 0.1$; $d \geq 0$ and $a+b+c+d=1$; M' being selected from the group consisting of B, Mg, Al, Si, Ca, Ti, V, Cr, Fe, Cu, Zn, Y, Zr, Nb, Mo or a mixture thereof;
from 90 to 20% of a lithiated phosphate of transition metals of the formula $LiMn_{1-y}M''_yPO_4$ where M'' represents Fe and optionally at least one element selected from the group consisting of Ni, Co, Mg and Zn; and $0<y<0,5$;
the lithiated oxide and the lithiated phosphate being in the form of particles;
the particle size distribution of the lithiated oxide being characterized by a first median volume diameter of the particles $Dv_{50}^1 \geq 1\mu$;
the particle size distribution of the lithiated phosphate being characterized by a second median volume diameter of the particles $Dv_{50}^2 \geq 3\mu$;
and $Dv_{50}^2/Dv_{50}^1 \geq 3$.

2. The positive electrode active material composition according to claim 1, wherein the lithiated phosphate of transition metals is coated with a carbon layer.

3. The positive electrode active material composition according to claim 1, wherein the composition comprises:
30 to 80% by weight of lithiated oxide
70 to 20% by weight of lithiated phosphate.

4. The positive electrode active material composition according to claim 1, wherein the composition comprises:
20 to 50% by weight of lithiated oxide
80 to 50% by weight of lithiated phosphate.

5. The positive electrode active material composition according to claim 1, wherein $Dv_{50}^2 \geq 15$ µm and $Dv_{50}^1 \geq 5$ µm.

6. The positive electrode active material composition according to claim 1,
wherein the lithiated phosphate comprises primary particles of the positive electrode active material composition.

7. An electrode comprising a positive electrode active material composition for an electrochemical lithium-ion cell comprising:
from 10 to 80% of a lithiated oxide of transition metals of formula $Li_{1+x}MO_2$ in which:
$0 \leq x \leq 0.10$, M denotes $Ni_aMn_bCo_cM'_d$ where $0.3 \geq c \geq 0.1$; $d \geq 0$ and $a+b+c+d=1$; M' being selected from the group consisting of B, Mg, Al, Si, Ca, Ti, V, Cr, Fe, Cu, Zn, Y, Zr, Nb, Mo or a mixture thereof;
from 90 to 20% of a lithiated phosphate of transition metals of the formula $LiMn_{1-y}M''_yPO_4$ where M'' represents Fe and optionally at least one element selected from the group consisting of Ni, Co, Mg and Zn; and $0<y<0.5$,
the lithiated oxide and the lithiated phosphate being in the form of particles,
the particle size distribution of the lithiated oxide being characterized by a first median volume diameter of the particles $Dv_{50}^1 \geq 1$ µm,
the particle size distribution of the lithiated phosphate being characterized by a second median volume diameter of the particles $Dv_{50}^2 \geq 3$ µm;
and $Dv_{50}^2/Dv_{50}^1 \geq =3$.

8. The electrode according to claim 7, comprising only the lithiated oxide of transition metals and the lithiated phosphate of transition metals as electrochemically active materials.

9. A lithium secondary cell comprising:
at least one positive electrode which is an electrode according to claim 7;
at least one negative electrode comprising a material capable of inserting and de-inserting lithium in its structure.

* * * * *